United States Patent
Kawasaki et al.

(10) Patent No.: US 8,075,647 B2
(45) Date of Patent: Dec. 13, 2011

(54) SLURRY FOR SLICING SILICON INGOT AND METHOD FOR SLICING SILICON INGOT USING THE SAME

(75) Inventors: Takafumi Kawasaki, Chiyoda-ku (JP); Seiichi Mimura, Chiyoda-ku (JP); Hirokazu Nishida, Chiyoda-ku (JP); Yasuhiro Yoshida, Chiyoda-ku (JP)

(73) Assignee: Mitsubishi Electric Corporation, Chiyoda-Ku, Tokyo (JP)

( * ) Notice: Subject to any disclaimer, the term of this patent is extended or adjusted under 35 U.S.C. 154(b) by 278 days.

(21) Appl. No.: 12/441,467

(22) PCT Filed: Oct. 20, 2006

(86) PCT No.: PCT/JP2006/320927
§ 371 (c)(1),
(2), (4) Date: Mar. 16, 2009

(87) PCT Pub. No.: WO2008/047446
PCT Pub. Date: Apr. 24, 2008

(65) Prior Publication Data
US 2010/0037880 A1 Feb. 18, 2010

(51) Int. Cl.
*B24D 3/02* (2006.01)
*C09C 1/68* (2006.01)
*C09K 3/14* (2006.01)

(52) U.S. Cl. ................................ 51/307; 51/308; 51/309

(58) Field of Classification Search .................... 51/307, 51/308, 309
See application file for complete search history.

(56) References Cited

U.S. PATENT DOCUMENTS
2,689,170 A * 9/1954 King ............................... 424/54

FOREIGN PATENT DOCUMENTS
| JP | 02-262955 A | 10/1990 |
| JP | 02-298280 A | 12/1990 |
| JP | 10-081872 A | 3/1998 |
| JP | 2001-164240 A | 6/2001 |
| JP | 2001-164284 A | 6/2001 |
| JP | 2005-088394 A | 4/2005 |

OTHER PUBLICATIONS

"Precision Processing of Crystalline Materials for Electronics," Jan. 30, 1980, pp. 198-201, Science Forum Inc. (in Japanese—with English summary of Item 3.).
International Search Report for PCT/JP2006/320927, mailed Nov. 21, 2006.

* cited by examiner

*Primary Examiner* — James McDonough
(74) *Attorney, Agent, or Firm* — Buchanan Ingersoll & Rooney PC

(57) ABSTRACT

The invention is a slurry for slicing a silicon ingot, containing a basic material, such as an alkali metal hydroxide, abrasive powder and water, in which the slurry contains the basic material in an amount of from 2 to 6% by mass and glycerin in an amount of from 25 to 55% by mass, based on a total mass of components of the slurry excluding the abrasive powder.

11 Claims, 3 Drawing Sheets

FIG. 4A1
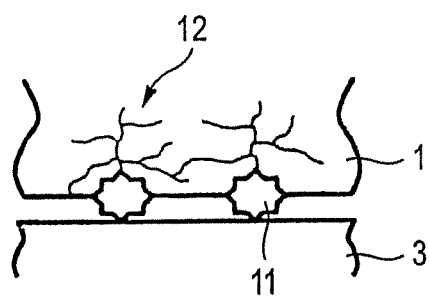
FIG. 4B1
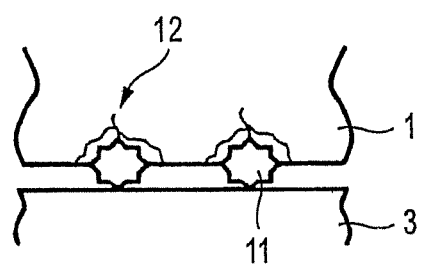
FIG. 4A2
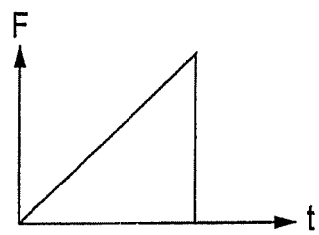
FIG. 4B2
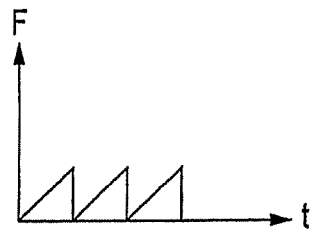

SLURRY FOR SLICING SILICON INGOT AND METHOD FOR SLICING SILICON INGOT USING THE SAME

TECHNICAL FIELD

The present invention relates to a slurry used upon slicing a silicon ingot, for example, for producing a wafer for a solar cell, and a method for slicing a silicon ingot using the same.

BACKGROUND ART

For slicing a silicon ingot, conventionally, a multi-wire saw has been used that is capable of slicing a large number of wafers at a time with a relatively small kerf loss. FIG. 1 shows a device constitution of a basic multi-wire saw for slicing a silicon ingot for producing a wafer for a solar cell. In a multi-wire saw 10 shown in the figure, numeral 1 denotes a silicon ingot, which is fixed by adhesion to a working plate 2, and in general, a material having a cross section of about 150 mm square and a length of about 400 mm is relatively frequently used.

Numeral 3 denotes a wire fed from a wire feeding mechanism 4, which is wound and suspended on two wire guide rollers 5 at a pitch of about from 0.3 to 0.4 mm and then wound up by a wire winding mechanism 6. A piano wire having a diameter of 0.16 mm is generally used as the wire 3. The wire 3 is fed at a speed of about 600 m/min while the feeding mechanism 4, the two wire guide rollers 5 and the winding mechanism 6 are driven with motors (which are not shown in the figure) that are synchronously controlled, and a prescribed tension is applied to the wire 3 by controlling the position of a tension roller 7. Slurry is applied to the wire 3 from a slurry agitating and feeding tank 8 through a slurry applying head 9. In this state, the ingot 1 fixed by adhesion to the working plate 2 is fed downward.

The slicing operation of the silicon ingot 1 using the wire saw 10 is effected in such a manner that a slicing slurry containing abrasive powder is fed between the running wire 3 and the ingot 1, and the abrasive powder are pressed onto the ingot 1 and simultaneously are rotationally moved with the wire 3, whereby microcracks are formed in the surface layer of the ingot 1 to scrape away the surface layer as silicon fine powder. In the slicing operation of the silicon ingot 1 in this manner, it is demanded to decrease the kerf loss and to decrease the thickness of the wafers in order to improve the yield of the wafers and to reduce the cost of materials of the wafers.

FIG. 2 is an enlarged view of the slicing part of the silicon ingot 1 using the multi-wire saw 10 and shows the relationship among the parameters upon slicing the silicon ingot 1. FIG. 3 is a schematic diagram showing the force applied to the wire in the slicing groove of the silicon ingot 1. In FIGS. 2 and 3, the following empirical expressions have been generally known in the art as showing the relationship among the feeding speed V of the silicon ingot 1, the feeding speed U of the wire 3, the slicing resistance P, the displacement $\delta x$ of the wire 3 in the direction perpendicular to the slicing direction, the displacement $\delta y$ of the wire 3 in the slicing direction, and the tension T of the wire 3.

$$P \propto V/U \quad (1)$$

$$\delta x \propto c \, P/T \quad (2)$$

$$\delta y \propto P/T \quad (3)$$

Upon feeding the slurry containing abrasive powder 11 to the interface to be sliced with the wire 3, the wire 3 is deflected to form the displacement $\delta y$, and the slicing resistance P is formed. The slicing resistance P is gradually increased but reaches constant at a prescribed value. At the slicing interface, the abrasive powder 11 are not uniformly dispersed, and the displacement $\delta x$ of the wire 3 is formed by acting a force proportional to the slicing resistance P in the direction perpendicular to the slicing direction.

In the case where the value of $\delta x$ is increased, wafers obtained by slicing the silicon ingot 1 suffer board warpage, unevenness in thickness and minute surface irregularities, so as to deteriorate the quality of the wafers. It may be suggested from the expression (2) that the slicing resistance P should be decreased in order to decrease $\delta x$.

Accordingly, the feeding speed V of the silicon ingot 1 may be decreased, or the feeding speed U of the wire 3 may be increased, as understood from the expression (1), but in the case where the feeding speed V of the ingot 1 is decreased, the slicing time is prolonged to deteriorate the production efficiency. In the case where the running speed U of the wire is increased, the consumption amount of the expensive wire is increased to increase the running cost for slicing. In order to decrease the kerf loss, it is necessary to decrease the diameter of the wire 3, but the breaking strength of the wire 3 is decreased thereby to provide necessity of decreasing the tension T applied to the wire 3. In the case where the tension T is decreased, the displacement $\delta x$ of the wire 3 is increased as understood from the expression (2), and thus the wafers are deteriorated in quality as having been described above.

Microcracks remain in the surface layer of the wafers after slicing. Upon producing a solar battery cell by processing the wafers, it is necessary to remove firstly the damaged layer by etching, and thus the wafer thickness is further decreased after slicing the ingot. In the case where the wafer thickness becomes smaller, the damage rate of the wafers in the transporting and processing steps of the wafers is increased. The depth of the damaged layer is about 10 μm in the conventional techniques, which impairs reduction in thickness of the wafers.

As a method for removing the problem, fundamental studies have been made for a wire saw using slurry containing an alkaline aqueous solution and abrasive powder. It has been reported that in the case where a chemical dissolution function is imparted to a processing liquid upon slicing a silicon ingot, the resistance on moving the wire (which is hereinafter referred to as a wire pulling resistance) is decreased, and the crack depth on the surface layer of the ingot is decreased (see, for example, in Non-patent Document 1).

FIG. 4 is a conceptual diagram for describing the effect obtained by imparting a chemical function to the slurry. In the figure, symbol A1 denotes the state where a neutral slurry is used, and A2 denotes the relationship between the time and the wire pulling resistance F of the wire 3 in this case. Symbol B1 denotes the state where alkaline slurry is used, and B2 denotes the relationship between the time and the wire pulling resistance F of the wire 3 in this case.

The abrasive powder 11 in the slurry are pressed on the ingot 1 and rotationally moved with the wire 3, whereby cracks 12 formed one after another on the surface of the ingot 1 are connected to each other, and fine powder of silicon is formed at regions where they reach the surface of the ingot 1 and discharged from the slicing groove with the abrasive powder rotationally moved and the flowing slurry liquid. The formation of fine powder means elimination of cracks. It has been studied therein that in the case where alkaline slurry is used, the cycle time from formation to elimination of cracks is shortened as understood from the comparison between A2 and B2, and fine powder is formed on and discharged from the surface of the ingot 1 before application of a large removing power (wire pulling resistance F) at the slicing interface.

In FIG. 2, the tension T is applied to the wire 3, whereby the displacement δx of the wire 3 in the direction perpendicular to the slicing direction is to be a prescribed value, but the wire pulling resistance F is added thereto in the portion of the wire 3 on the side where the wire is withdrawn from the ingot 1. In the case where the wire pulling resistance F is decreased, the force applied to the wire 3 is decreased. The diameter of the wire 3 is decreased through movement of the wire 3 from the feeding side to the winding side of the wire since the wire is continuously abraded with the abrasive powder. In the case where the wire pulling resistance F is decreased, the abrading force is also decreased to suppress reduction in diameter of the wire 3. The reduction of the wire pulling resistance F applied to the wire 3 and the reduction of the abrading amount of the wire provide capability of reducing the diameter of the wire, and thus the kerf loss can be decreased.

On the line of the aforementioned approach, such a single wire saw has been proposed that uses an alkaline slurry of pH 9 or more at from 30 to 80° C. or a acidic slurry of pH of from 3 to 6 at from 25 to 65° C. (see Patent Document 1).

Such a method of slicing a material to be processed has been proposed in that an etching liquid containing no abrasive particle is coated on a wire, and the temperature of the etching liquid is increased to 50 to 60° C. by frictional heat formed between the wire and the material to be processed (see Patent Document 2).

Non-Patent Document 1:

Electronics yo Kessho Zairyo no Seimitsu Kako (Precision Processing of Crystalline Materials for Electronics), published on January 30, Showa 60 (1980), by Science Forum Inc.

Patent Document 1: JP-A-2-262955
Patent Document 2: JP-A-2-298280

DISCLOSURE OF THE INVENTION

Problems to be Solved by the Invention

Upon slicing a silicon ingot for producing wafers for solar cells, it is demanded to slice into several thousands of wafers at a time from the standpoint of allowable production cost. The sliced wafer is used after removing the slicing damaged layer on the surface thereof by etching, but the step of finishing the surface by polishing as in wafers for semiconductors may not be added from the standpoint of avoiding increase in production cost. Accordingly, it is necessary to satisfy demanded values of undulation and variation in thickness of the wafers only by slicing an ingot.

The method of coating an etching liquid to a wire as disclosed in Patent Document 2 requires strict management of the contact force of the wire to the material to be processed and the temperature at the slicing interface, and the method can be practiced with a single wire system but cannot be realized upon slicing with a large number of wires.

In the slicing operation of an ingot using acidic or alkaline slurry containing abrasive powder as disclosed in Patent Document 1, such factors are important as control of the reaction of silicon with acid or alkali and maintenance of the dispersibility of the reaction products and the abrasive powder in the liquid. The wire forms a slicing groove through progress in the slicing direction, and since the slurry is continuously supplied to the slicing groove, dissolution in the direction perpendicular to the slicing direction (i.e., the thickness direction of the wafer) proceeds in the slicing initiation part as compared to the slicing termination part.

Upon slicing a silicon ingot for producing wafers for solar cells, the wafer thickness may not be corrected by additional polishing, and thus the demanded value of wafer thickness cannot be satisfied when the etching effect is excessive. Furthermore, a large amount of slurry is necessarily used for slicing out several thousands of wafers from an ingot, which is realized by circulating the slurry between the agitation tank and the slicing part. In the case where aggregation occurs due to deterioration in dispersibility of reaction products with silicon and the abrasive powder, feeding of the abrasive powder to the slicing interface is imparted, whereby the wire pulling resistance of the wire is increased to break the wire, and the slicing resistance is increased to increase the displacement of the wire in the direction perpendicular to the slicing direction, which causes undulation and steps on the surface of the wafer.

As a result of a slicing experiment of a silicon ingot of 150 mm square with 50 wires using an alkaline aqueous solution slurry adjusted to pH 12 at 60° C. containing abrasive powder, the displacement of the wire in the direction perpendicular to the slicing direction was large, the adjacent wires slice the same groove, and the wire was broken after slicing in a depth of 50 to 70 mm. It was found as a result of analysis that this is because the abrasive powder were not sufficiently supplied to the slicing interface due to aggregation of the reaction products and the abrasive powder, whereby the slicing resistance and wire pulling resistance of the wire were increased. There were some cases where completely no abrasive particle was supplied to the slicing interface, and the temperature at the slicing part of the ingot was rapidly increased due to direct friction between the ingot and the wire to break the wire.

Upon slicing an ingot using slurry having a chemical function and containing abrasive powder, it is necessary to determine such a slurry formulation that realizes control of the chemical reaction and maintenance of dispersibility of the reaction products and the abrasive powder in the liquid. The invention is to solve the aforementioned problems, and an object thereof is to provide such a slicing slurry in that upon slicing a silicon ingot, the wire pulling resistance of the wire is small, and the ingot can be sliced while suppressing unevenness in thickness, minute irregularities and damages on the surface layer of the wafer, and to provide a method for slicing a silicon ingot using the same.

Means for Solving the Problems

The invention relates to slurry for slicing a silicon ingot, containing abrasive powder, a basic material and water, the slurry containing the basic material in an amount of from 2 to 6% by mass and glycerin in an amount of from 25 to 55% by mass, based on a total mass of components of the slurry excluding the abrasive powder.

Advantage of the Invention

The slurry for slicing a silicon ingot of the invention is an aqueous slurry containing a basic material, glycerin and abrasive powder, and the components are contained in suitable amounts, respectively, based on the mass of the total liquid components of the slurry, whereby the chemical action with silicon can be controlled, and the dispersibility of reaction products and the abrasive powder in the liquid can be maintained. Accordingly, synergistic effects of chemical action and physical action upon slicing a silicon ingot can be enjoyed, and the removing power of silicon at the slicing interface (i.e., the wire pulling resistance of the wire) can be decreased with the demanded quality of wafers for solar cells maintained, whereby an ingot can be thinly sliced into wafers by decreasing the kerf loss and the slicing damage with a thin wire to attain reduction in cost of wafers.

Other objects, characteristics, viewpoints and advantages than those described above will be apparent from the following detailed description of the invention referring to the drawings.

BRIEF DESCRIPTION OF THE DRAWINGS

FIG. 4 is a conceptual diagram for describing the effect obtained by imparting a chemical function to the slurry.

Figure 1:
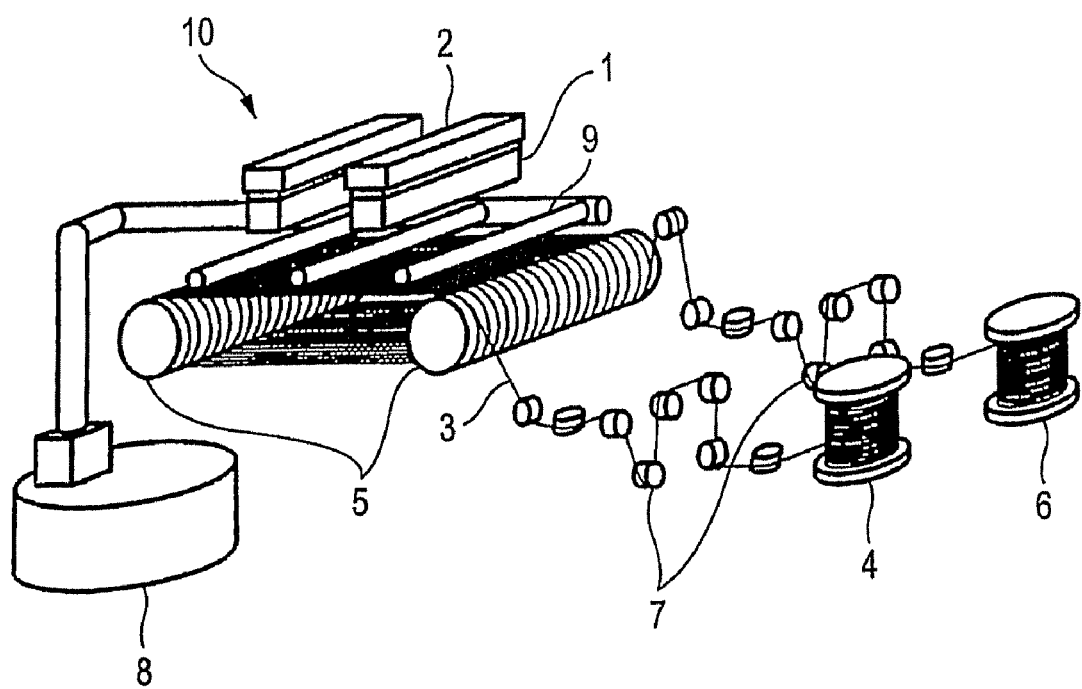
FIG. 1 is a diagram showing a schematic constitution of a multi-wire saw for slicing a silicon ingot used in the invention.
Figure 2:
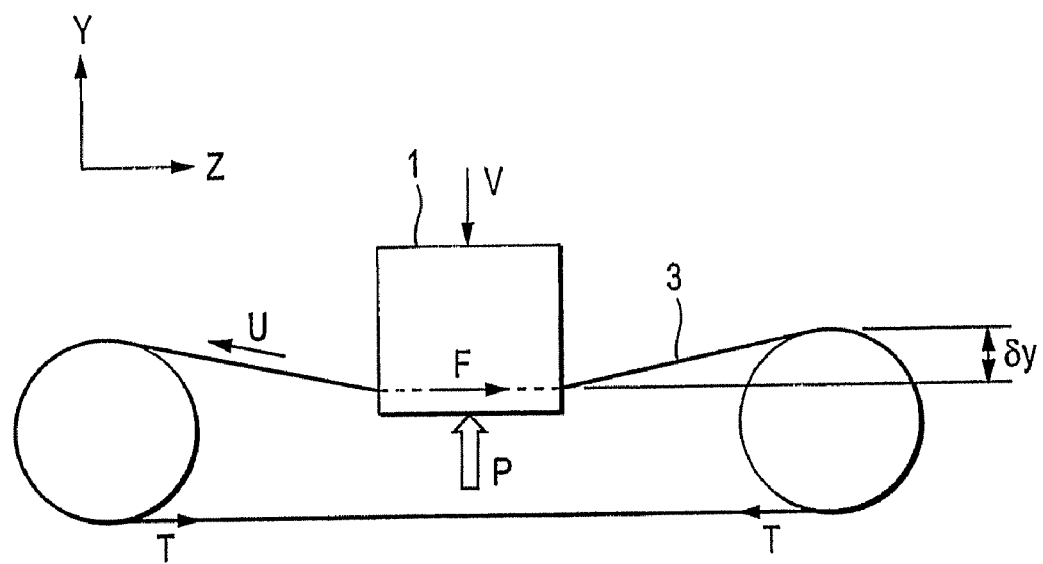
FIG. 2 is an enlarged view of a slicing part of a silicon ingot using the multi-wire saw.
Figure 3:
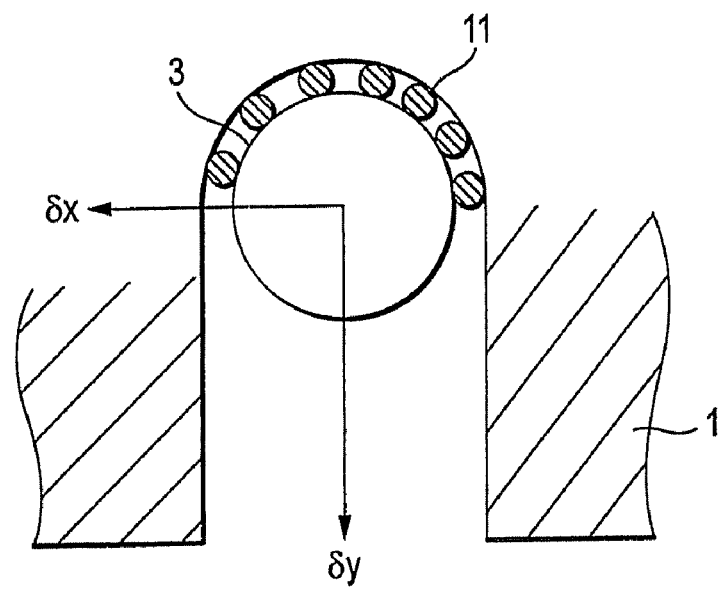
FIG. 3 is a schematic diagram showing the force applied to the wire in the slicing groove of the silicon ingot.

DESCRIPTION OF SYMBOLS 1 ingot
2 silicon ingot feeding mechanism
3 wire
4 wire feeding mechanism
5 roller
6 wire winding mechanism
7 tension controlling roller
8 slurry agitating and feeding tank
9 slurry coating head
10 multi-wire saw

BEST MODE FOR CARRYING OUT THE INVENTION

Embodiment 1

Upon slicing a silicon ingot with a multi-wire saw, it is necessary to supply abrasive powder continuously to the slicing interface in a suitable amount. A wire is used as means for conveying the abrasive powder to the slicing interface, and a liquid is necessarily used as a medium for dispersing and carrying the abrasive powder on the wire and for reducing the frictional force among the wire, the abrasive powder and the ingot and effecting cooling at the slicing interface. It is necessary to manage the viscosity of the liquid within a certain range. In the case where the viscosity is low, the necessary amount of the abrasive powder cannot be carried on the wire, and in the case where the viscosity is high, on the other hand, the liquid cannot permeate to the slicing interface, and thus the necessary amount of the abrasive powder cannot be supplied to the slicing interface similarly. Furthermore, the liquid pressure at the slicing part is increased to cause a force separating the wafers that are being sliced, and the flexure stress at the slicing interface is increased by the force to break the wafers. It is also important to disperse the abrasive powder in the liquid. In the case where the abrasive powder are aggregated, the abrasive powder are accumulated at the inlet, through which the wire enters from the outside of the ingot to the slicing part, whereby the amount of the abrasive powder supplied to the slicing interface is decreased, and moreover, the wire pulling resistance of the wire is increased to break the wire.

It is important to select such a liquid that has a prescribed viscosity, does not decrease the chemical action of the basic material, and does not cause increase in viscosity and aggregation of the abrasive powder due to silicate and silica as reaction products of the basic material and silicon. As a result of various investigations, it has been found that glycerin is suitable as the liquid having these properties. Glycerin has a suitable viscosity, has a large polarity to suppress decrease of the zeta potential in the slurry liquid due to formation of silicate and silica, and has good affinity with water to suppress the increase in viscosity of the slurry due to hydration and gelation of silicate and silica with water.

In the case where the amount of the basic material is small, the proportion of silica in the silicate is increased to accelerate decrease in zeta potential and increase in viscosity, in addition to the failure in exertion of the chemical action. In the case where the amount of the basic material is large, on the other hand, the etching action becomes too large, and thus the dissolution amount of the wafer at the slicing initiation part exceeds the limit. The amount of hydrogen formed through reaction with silicon becomes excessive to increase the amount of gas bubbles in the slurry at the slicing interface, which considerably decreases the slicing speed due to a large amount of abrasive powder depletion parts, whereby in some cases, the liquid lubricating contact among the wire, the abrasive powder and the silicon ingot is lost to break the wire due to the frictional force thus increased.

It is important to manage the amount of the basic material, and it has been found that there is an optimum value therefor with respect to the mass ratio of glycerin in the slurry liquid components.

In the component ratios of the first slurry for slicing a silicon ingot of the invention, while maintaining the demanded quality of wafers for solar cells, the removing power of silicon at the slicing interface (the wire pulling resistance of the wire) can be decreased, and control of the chemical action of the slurry with silicon and dispersibility of the reaction products and the abrasive powder in the liquid can be maintained. It has been found that the expected advantages cannot be obtained outside the component ratios.

Although various kinds of alcohol, amine, ether, polyethylene glycol and the like have been studied other than glycerin, there has been no material that has a stable viscosity, causes no aggregation of the abrasive powder, and maintains the suitable chemical action, under the slicing conditions where oxidation reaction of silicon occurs. Furthermore, glycerin can decrease the slicing resistance while the etching speed suppressed from being increased, at a low concentration of the basic material as compared with that of other liquid. While the reasons therefor are not clear, it is considered that the presence of glycerin increases the proportion of the basic material with respect to water to increase the effect (active amount) of the base. The suitable viscosity of glycerin decreases the diffusion rate of substances on the silicon surface. While oxidation reaction is liable to proceed at the slicing part with the wire where the slurry flows vigorously, it is expected that oxidation reaction, i.e., etching, is hard to proceed in the part where the liquid flow on the wafer surface is small.

The first slurry for slicing a silicon ingot of the invention is a slurry for slicing a silicon ingot containing abrasive powder, a basic material and water, in which the amount of the basic material is from 2 to 6% by mass, and the amount of glycerin is from 25 to 55% by mass, based on the total mass of the components of the slurry excluding the abrasive powder.

The abrasive powder may be those generally used as an abrasive material, and examples thereof include silicon carbide, cerium oxide, diamond, boron nitride, aluminum oxide, zirconium oxide and silicon dioxide, which may be used solely or as a combination of two or more kinds thereof. The compounds capable of being used as the abrasive powder are commercially available, and specifically, for example, silicon carbide is available under the trade names GC (Green Silicon Carbide) and C (Black Silicon Carbide) (produced by Fujimi Incorporated), and aluminum oxide is available under the trade names FO (Fujimi Optical Emery), A (Regular Fused Alumina), WA (White Fused Alumina) and PWA (Platelet Calcined Alumina) (produced by Fujimi Incorporated).

The average particle diameter of the abrasive powder is not particularly limited, and is preferably from 5 to 20 μm. In the case where the average particle diameter of the abrasive powder is less than 5 μm, it is not preferred since the slicing speed becomes too small to deteriorate practicality, and in the case where the average particle diameter of the abrasive powder exceeds 20 μm, it is not preferred since the surface roughness of the wafer surface after slicing is increased to deteriorate the quality of the wafers in some cases.

The content of the abrasive powder is not particularly limited, and is preferably from 40 to 60% by mass based on the total mass of the slurry for slicing a silicon ingot. In the case where the content of the abrasive powder is less than 40% by mass, the slicing speed becomes too small to deteriorate practicality in some cases, and in the case where the content of the abrasive powder exceeds 60% by mass, the viscosity of the slurry becomes too large to impair supply of the slurry to the slicing interface in some cases.

The basic material may be such a substance that functions as a base in the slurry, and examples thereof include an alkali metal hydroxide, such as lithium hydroxide, sodium hydroxide and potassium hydroxide, and an alkali earth metal hydroxide, such as magnesium hydroxide, calcium hydroxide and barium hydroxide, which may be used solely or as a combination of two or more kinds thereof. Among these materials, an alkali metal hydroxide is preferably used from the standpoint of reactivity with a silicon ingot.

A mixture of water and glycerin is used as the liquid component of the slurry. The water is preferably one having a small impurity content, but is not limited thereto. Specific examples thereof include pure water, extra-pure water, tap water and industrial water.

The slurry for slicing a silicon ingot can be prepared by mixing the aforementioned components at desired ratios. The method of mixing the components may be arbitrarily selected, and for example, the components may be agitated by a blade mixer. The order of mixing the component may also be arbitrarily selected. Furthermore, the slurry for slicing a silicon ingot thus prepared may be subjected to an additional process, such as a filtering process and an ion exchange process, for such a purpose as purification.

In the method for slicing a silicon ingot of the invention, a multi-wire saw is used as a slicing device. In the slicing method, as having been described, the first slurry of the invention is supplied to a slurry coating head with a pump while agitating in an agitating tank, the slurry is applied from the slurry coating head to a wire that is wound and suspended on guide rollers in a large number of times and is moved at a high speed, and a silicon ingot is fed to the wire thus wound and suspended. The abrasive powder are pressed onto the silicon ingot and simultaneously are rotationally moved with the wire, whereby silicon is physically removed as fine powder at the slicing interface, and simultaneously, the removal attains with a small force with the chemical action of the basic material.

Examples of actual slicing operations using the first slurry for slicing a silicon ingot will be described in more detail as compared to comparative examples.

Five kinds of slurries for slicing a silicon ingot as shown in Example 1 and Comparative Examples 1 to 4 were produced, and silicon ingots were sliced under the following conditions to obtain results shown in Table 1. Upon producing the slurries, in all the cases, SiC abrasive powder (GC #1500, having average particle diameter of about 8 μm, produced by Fujimi Incorporated) were used as the abrasive powder, and the mass ratio between the abrasive powder and the other components than the abrasive powder in the slurry was 1/1. The viscosity of the slurries was adjusted to a value of from 50 to 130 mPa·s at a shear rate of 57.6 (1/sec) and a slurry temperature of 25° C. The viscosity range was obtained by a preliminary experiment as a suitable viscosity range upon slicing a silicon ingot with a multi-wire saw using an aqueous slurry containing abrasive powder.

(Slicing Conditions)
Slicing device: multi-wire saw (having a device constitution shown in FIG. 1)
Wire diameter: 0.1 mm (model SRH, produced by Japan Fine Steel Co., Ltd.)
Abrasive powder: silicon carbide (GC #1500, produced by Fujimi Incorporated, average particle diameter: about 8 μm)
Silicon ingot: two ingots having a cross section of 150 mm square and a length of 250 mm disposed
Slicing pitch: 0.33 mm (kerf loss: 0.13 mm, wafer thickness: 0.2 mm)
Slicing speed: 0.35 mm/min (ingot feeding speed)
Wire running speed: 600 m/min
Wire tension: 14 N
Slurry tank temperature setting: 25° C.

Example 1

A mixed liquid of 40% by mass of glycerin, 56% by mass of water and 4% by mass of sodium hydroxide was produced, to which the same amount of abrasive powder were then added, and the mixture was agitated.

Comparative Example 1

A mixed liquid of 39% by mass of propylene glycol, 1% by mass of polyvinyl alcohol, 56% by mass of water and 4% by mass of sodium hydroxide was produced, to which the same amount of abrasive powder were then added, and the mixture was agitated.

Comparative Example 2

A mixed liquid of 45% by mass of ethylene glycol, 51% by mass of water and 4% by mass of sodium hydroxide was produced, to which the same amount of abrasive powder were then added, and the mixture was agitated.

Comparative Example 3

A mixed liquid of 50% by mass of diethanolamine, 46% by mass of water and 4% by mass of sodium hydroxide was produced, to which the same amount of abrasive powder were then added, and the mixture was agitated.

Comparative Example 4

A commercially available neutral coolant (Luna Coolant #691, produced by Ohtomo Chemical Co., Ltd.) was mixed with the same amount of abrasive powder, and the mixture was agitated.

TABLE 1

| | Wire | | | Slurry | | Wafer | | |
|---|---|---|---|---|---|---|---|---|
| | Breakage | Wire pulling resistance (N) | Wear rate (%) | Increase rate of viscosity (%) | Solidification | Fluctuation in thickness (μm) | Surface irregularity | Crack depth (μm) |
| Example 1 | none | 0.8 ± 0.07 | 14 | 20 | none | 11 | none | 0 |
| Comparative Example 1 | found | 1.1 ± 0.35 | — | — | found | — | — | — |
| Comparative Example 2 | found | 1.2 ± 0.30 | — | — | found | — | — | — |
| Comparative Example 3 | found | 0.7 ± 0.20 | 13 | 250 | found | 8 | medium | 0 |
| Comparative Example 4 | found | 2.5 ± 0.26 | 23 | 40 | none | 35 | small | 10 |

The presence of breakage of the wire in Table 1 shows a result obtained by carrying out the silicon ingot slicing experiment in three times each for Example 1 and Comparative Examples 1 to 4. The slicing operation was completed in all the three experiments without breakage of the wire only in Example 1. In Comparative Examples 1 and 2, the wire was broken until the silicon ingot of 150 mm square was completely sliced in all the three experiments, and thus the wire pulling resistance and the solidification state of the slurry that could be measure were only shown. In Comparative Examples 3 and 4 each, the wire was broken during the slicing operation in two experiments, and the wire was broken during the slicing operation of dummy glass, to which the silicon ingot was adhered and fixed, in one experiment.

For Example 1 where wafers were obtained, the worst values among the three experimental values were shown for the other evaluation items. For Comparative Examples 3 and 4, the measurement values of the experiment where wafers were obtained were shown. The wire wear rate means a decreasing rate of wire cross sectional area after completing the slicing operation of the silicon ingot with respect to the wire cross sectional area before use. The slurry viscosity increasing rate means an increasing rate of the slurry viscosity after completing the slicing operation of the silicon ingot with respect to the slurry viscosity before slicing the silicon ingot. The presence of solidification of the slurry shows whether or not aggregates of the slurry are formed during the slicing operation of the silicon ingot.

The fluctuation in thickness of wafers is derived from two factors, i.e., the displacement of the wire upon slicing the silicon ingot and the dissolution due to the etching action in the slicing termination part with the alkaline slurry. These factors were not distinguished from each other, and five wafers for each of both ends parts and center part of each of two ingots, i.e., 30 wafers in total, were sampled and measured for thickness at nine points per one wafer, i.e., four corners, intermediate points thereof, and center point. The standard deviation was calculated from the data of 270 points in total. The surface irregularity of the wafers shows the extent of steps of minute undulation and saw marks on the surface. The large irregularity means poor quality, and the no irregularity means such an extent that cannot be found visually. The crack depth on the wafer surface layer is a result of SEM observation of the cross section obtained by cutting the part of the wafer surface that suffers relatively large irregularity. The crack depth of 0 μm means that no crack is found from the concave part on the surface to the lower layer.

In Comparative Example 3 (alkaline slurry), the wire pulling resistance of the wire was small as compared to Comparative Example 4 (neutral slurry) to obtain the similar effect as Example 1, but fluctuation in wire pulling resistance was large. Furthermore, the increasing rate of the viscosity of the slurry was large, and solidification of the slurry and separation between the solidified slurry and the liquid phase were found. Comparative Example 3 provided a smaller fluctuation in wafer thickness than Example 1, no crack in the surface layer as similar thereto, and a small wear rate of the wire, which were considered as good properties, but the action of the abrasive powder was unstable upon slicing, which was found from the fact that the state of the slurry was considerably unstable, and the fluctuation rate of the wire pulling resistance of the wire was large. In Example 1, the effect of the use of the alkaline slurry is obtained, and simultaneously, the stable slicing operation was realized without breakage of the wire, so as to obtain good results for all the evaluation items.

The component ratios capable of attaining a stable slicing operation of a silicon ingot were investigated by changing the component ratios of the slurry of Example 1. Correlativity was found among the wire pulling resistance of the wire, the wear rate of the wire and the crack depth in the surface layer of the wafer, and therefore, the presence of breakage and the wire pulling resistance of the wire, the increasing rate of viscosity and the presence of solidification of the slurry, and the irregularity on the surface and the fluctuation in thickness of the wafers were used as the evaluation items. The evaluation methods for the items were the same as those in Table 1. The mass ratio between the abrasive powder and the other components than the abrasive powder in the slurry was 1/1, and the same slicing experiments as above were carried out with the contents of glycerin and sodium hydroxide changed. The results obtained are shown in Table 2.

TABLE 2

| | Ratios of components in mixed liquid excluding abrasive powder (% by mass) | | | Wire | Wire pulling resistance (N) | Slurry | | Wafer | |
|---|---|---|---|---|---|---|---|---|---|
| | Sodium hydroxide | Glycerin | Water | Breakage | | Increase rate of viscosity (%) | Solidification | Surface irregularity | Fluctuation in thickness (μm) |
| Comparative Example 5 | 1 | 40 | 59 | found | 2.1 ± 0.36 | 73 | found | large | 29 |
| Comparative Example 6 | 2 | 20 | 78 | found | 1.8 ± 0.25 | 27 | none | large | 23 |
| Example 2 | 2 | 25 | 73 | none | 1.6 ± 0.15 | 24 | none | none | 16 |
| Example 3 | 2 | 55 | 43 | none | 1.5 ± 0.09 | 80 | none | none | 14 |
| Comparative Example 7 | 2 | 60 | 38 | none | 1.5 ± 0.08 | 115 | found | small | 20 |
| Comparative Example 8 | 4 | 20 | 76 | none | 0.9 ± 0.35 | 38 | found | medium | 16 |
| Comparative Example 9 | 4 | 60 | 36 | none | 0.8 ± 0.07 | 105 | found | small | 14 |
| Comparative Example 10 | 6 | 20 | 74 | none | 0.7 ± 0.38 | 50 | found | large | 15 |
| Example 4 | 6 | 25 | 69 | none | 0.6 ± 0.20 | 48 | none | none | 11 |
| Example 5 | 6 | 55 | 39 | none | 0.7 ± 0.15 | 94 | none | none | 14 |
| Comparative Example 11 | 6 | 60 | 34 | none | 0.7 ± 0.16 | 119 | found | none | 19 |
| Comparative Example 12 | 7 | 40 | 53 | found | 0.6 ± 0.35 | 139 | found | none | 31 |

It is understood from Table 2 that the wire pulling resistance of the wire is increased when the content of sodium hydroxide is small. In Comparative Example 5 (sodium hydroxide content: 1% by mass), no large difference was obtained in wire pulling resistance of the wire from Comparative Example 4 (neutral slurry) in Table 1, and thus no effect was obtained by using the alkaline slurry. In Comparative Example 12 (sodium hydroxide content: 1% by mass), dissolution of the wafer in the slicing initiation part proceeded due to the too large action of alkali, and thus the fluctuation in thickness of the wafer was increased. The other evaluation items thereof were also poor. It was considered that no surface irregularity of the wafer was obtained by affection of the alkali etching action.

A large content of glycerin provides a relatively small wire pulling resistance of the wire with small fluctuation thereof, but a large content of glycerin provides a high increasing rate of the slurry viscosity.

A slurry having a large glycerin content had a large viscosity at the time of preparation of the slurry, and thus the wire was not broken in Comparative Examples 9 and 11. However, the increasing rates of slurry viscosity thereof exceeded 100%, and solidification (gelation) of the slurry was found, which showed unstable property of the slurry.

In Comparative Example 6, the average value of the wire pulling resistance of the wire was lower than that in Comparative Example 5 to provide effect of the use of the alkaline slurry, but the fluctuation in wire pulling resistance was large, and the other evaluation items provided poor results, which brought about an unstable slicing operation of a silicon ingot. A stable slicing operation of a silicon ingot was obtained in Examples 2 and 3 having the same sodium hydroxide content but having a higher glycerin content, but in Comparative Example 7 having a higher glycerin content, the increasing rate of slurry viscosity thereof exceeded 100%, and solidification (gelation) of the slurry was found, which showed unstable property of the slurry.

Solidification of the slurry was found in Comparative Examples 8, 9 and 10. In Comparative Example 8, the surface irregularity of the wafer was large, and the wire pulling resistance of the wire was unstable. In Comparative Example 10, the surface irregularity of the wafer was unallowably large, and the wire pulling resistance of the wire was unstable. Comparative Example 9 provided the best evaluation results among Comparative Examples 5 to 12, but the increasing rate of slurry viscosity thereof exceeded 100%, which showed unstable property of the slurry. Examples 4 and 5 provided results that were equal to or better than Examples 2 and 3.

As having been described, in the case where a slurry contains a basic material in an amount of from 2 to 6% by mass and glycerin in an amount of from 25 to 55% by mass, based on the total mass of the components of the slurry excluding the abrasive powder, the effect of the use of the alkaline slurry is obtained, and a stable slicing operation is realized without breakage of a wire, so as to provide good results in all the evaluation items.

Embodiment 2

The second slurry for slicing a silicon ingot of the invention can considerably decrease unevenness in thickness of wafers for solar cells by adding a small amount of a nonionic polymer surfactant to the slurry described in Embodiment 1. As having been described, upon forming a slicing groove with a wire proceeding in the slicing direction, the slurry is continuously supplied to the slicing groove, whereby dissolution of the wafer in the direction perpendicular to the slicing direction (the thickness direction of the wafer) proceeds by the etching action in the slicing initiation part as compared to the slicing termination part of the ingot. As a result of investigations of various kinds of surfactant in order to prevent the dissolution in the part where the slicing operation is completed without decrease in chemical action at the slicing interface, it has been found that the dissolution in the part where the slicing operation is completed can be largely suppressed through reduction in chemical action within the allowable range by adding a suitable amount of a nonionic polymer surfactant.

A nonionic polymer surfactant was then added to the slurry of Example 1 to verify the effect of suppressing the dissolution amount in the slicing initiation part of the wafer upon slicing a silicon ingot. As a result of investigations of various kinds of surfactants by a beaker experiment, Adeka Pluronic L31, produced by Adeka Corp. was optimum as the nonionic polymer surfactant and was used. A mixture of 4% by mass of sodium hydroxide and 40% by mass of glycerin, based on the total mass of the components of the slurry excluding the abrasive powder, in which the addition amount of the nonionic polymer surfactant was increased (the same amount of water was decreased), was added with SiC abrasive powder (GC #1500, produced by Fujimi Incorporated) in the same amount as the total components in the slurry excluding the abrasive powder, so as to produce a slurry. The same slicing experiment as above was carried out to evaluate the wire pulling resistance of the wire and the fluctuation in wafer thickness. The results are shown in Table 3.

TABLE 3

| Concentration of surfactant (% by mass) | Wire pulling resistance of wire (N) | Fluctuation in wafer thickness (μm) |
|---|---|---|
| 0.1 | 0.8 ± 0.08 | 12 |
| 0.2 | 0.9 ± 0.08 | 8 |
| 0.4 | 1.3 ± 0.06 | 7 |
| 0.6 | 1.7 ± 0.05 | 6 |
| 0.8 | 2.0 ± 0.08 | 8 |
| 0.9 | 2.1 ± 0.10 | 10 |
| 1.0 | 2.3 ± 0.15 | 17 |

It is understood from Table 3 that the wire pulling resistance of the wire is increased upon increasing the concentration of the surfactant, and at 1.0% by mass, becomes such a value that is equivalent to the value obtained by using the neutral slurry in Comparative Example 4 to fail to obtain the effect of using the alkaline slurry, which shows that the limit of addition is 0.9% by mass. It is also understood that the effect of suppressing the dissolution amount in the slicing initiation part of the wafer upon slicing the ingot cannot be obtained at an addition concentration of 0.1% by mass, and the effect is obtained at 0.2% by mass.

As having been described, the second slurry for slicing a silicon ingot of the invention is a slurry for slicing a silicon ingot containing abrasive powder, a basic material and water, in which the amount of the basic material is from 2 to 6% by mass, the amount of glycerin is from 25 to 55% by mass, and the amount of a nonionic polymer surfactant is from 0.2 to 0.9% by mass, based on the total mass of the components of the slurry excluding the abrasive powder, whereby the dissolution in the part where the slicing operation is completed can be suppressed without reduction in chemical action at the slicing interface.

Various modifications and changes may be applied to the invention by a skilled person in the art without departing from the scope and spirit of the invention, and the invention is not construed as being limited to the embodiments described in the specification.

The invention claimed is:

1. A slurry for slicing a silicon ingot, comprising abrasive powder, a basic material and water, wherein the slurry comprises the basic material in an amount of from 2 to 6% by mass and glycerin in an amount of from 25 to 55% by mass, based on a total mass of components of the slurry excluding the abrasive powder,
    wherein one or a combination of two or more of silicon carbide, cerium oxide, diamond, boron nitride, aluminum oxide, zirconium oxide and silicon dioxide is used as the abrasive powder.

2. A slurry for slicing a silicon ingot, comprising abrasive powder, a basic material and water, wherein the slurry comprises the basic material in an amount of from 2 to 6% by mass, glycerin in an amount of from 25 to 55% by mass, and a nonionic polymer surfactant in an amount of from 0.2 to 0.9% by mass, based on a total mass of components of the slurry excluding the abrasive powder.

3. The slurry for slicing a silicon ingot as claimed in claim 1, wherein the abrasive powder has an average particle diameter of from 5 to 20 μm, and a content of the abrasive powder is from 40 to 60% by mass based on a total mass of the slurry for slicing a silicon ingot.

4. The slurry for slicing a silicon ingot as claimed in claim 1, wherein an alkali metal hydroxide or an alkali earth metal hydroxide is used as the basic material.

5. A method for slicing a silicon ingot with a slurry comprising abrasive powder and a basic material, wherein the slurry comprises the basic material in an amount of from 2 to 6% by mass and glycerin in an amount of from 25 to 55% by mass, based on a total mass of components of the slurry excluding the abrasive powder,
    wherein one or a combination of two or more of silicon carbide, cerium oxide, diamond, boron nitride, aluminum oxide, zirconium oxide and silicon dioxide is used as the abrasive powder.

6. A method for slicing a silicon ingot with a slurry comprising abrasive powder and a basic material, wherein the slurry comprises the basic material in an amount of from 2 to 6% by mass, glycerin in an amount of from 25 to 55% by mass, and a nonionic polymer surfactant in an amount of from 0.2 to 0.6% by mass, based on a total mass of components of the slurry excluding the abrasive powder.

7. The method for slicing a silicon ingot as claimed in claim 5, wherein a multi-wire saw is used as a slicing device to produce wafers for solar cells.

8. The slurry for slicing a silicon ingot as claimed in claim 2, wherein one or a combination of two or more of silicon carbide, cerium oxide, diamond, boron nitride, aluminum oxide, zirconium oxide and silicon dioxide is used as the abrasive powder.

9. The slurry for slicing a silicon ingot as claimed in claim 2, wherein the abrasive powder has an average particle diameter of from 5 to 20 μm, and a content of the abrasive powder is from 40 to 60% by mass based on a total mass of the slurry for slicing a silicon ingot.

10. The slurry for slicing a silicon ingot as claimed in claim 2, wherein an alkali metal hydroxide or an alkali earth metal hydroxide is used as the basic material.

11. The method for slicing a silicon ingot as claimed in claim 6, wherein a multi-wire saw is used as a slicing device to produce wafers for solar cells.

* * * * *